(12) United States Patent
Bernett

(10) Patent No.: US 6,320,723 B1
(45) Date of Patent: Nov. 20, 2001

(54) PROTECTIVE COVER FOR A DISC DRIVE PRINTED CIRCUIT BOARD WHEREIN THE COVER AND A CIRCUIT BOARD COMPONENT ARE THERMALLY CONNECTED

(75) Inventor: Frank William Bernett, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/506,525

(22) Filed: Feb. 17, 2000

Related U.S. Application Data

(60) Provisional application No. 60/140,864, filed on Jun. 24, 1999.

(51) Int. Cl.[7] .................................................. G11B 33/14
(52) U.S. Cl. ........................................ 360/97.02; 361/720
(58) Field of Search ............................. 360/97.01–98.01; 361/687, 688, 720

(56) References Cited

U.S. PATENT DOCUMENTS

| | | | | |
|---|---|---|---|---|
| 3,740,735 | * | 6/1973 | Gabor ................................ | 360/97.02 |
| 5,587,855 | * | 12/1996 | Kim .................................. | 360/97.02 |
| 5,598,320 | * | 1/1997 | Toedtman et al. ................... | 361/687 |
| 5,768,049 | * | 6/1998 | Morehouse et al. ............... | 360/97.01 |
| 5,892,655 | * | 4/1999 | Grouell .............................. | 361/690 |
| 6,005,768 | * | 12/1999 | Jo ....................................... | 361/685 |
| 6,072,697 | * | 6/2000 | Garcia-Ortiz ....................... | 361/704 |
| 6,101,089 | * | 8/2000 | Seto et al. ........................... | 361/687 |
| 6,108,164 | * | 8/2000 | Weber, Jr. .......................... | 360/97.02 |
| 6,205,025 | * | 3/2001 | Chen .................................. | 361/704 |
| 6,222,732 | * | 4/2001 | Jakob et al. ....................... | 361/704 |
| 6,239,972 | * | 5/2001 | Tehan et al. ....................... | 361/704 |
| 6,249,436 | * | 6/2001 | Bollesen ............................ | 361/720 |

FOREIGN PATENT DOCUMENTS

| | | | |
|---|---|---|---|
| 2000-339918 | * | 12/2000 | (JP) . |
| 6-195961 | * | 7/1994 | (JP) .................................. 360/97.02 |

\* cited by examiner

*Primary Examiner*—Jefferson Evans
(74) *Attorney, Agent, or Firm*—Paul J. Prendergast; Merchant & Gould P.C.

(57) ABSTRACT

A protective cover used as a heat sink is disclosed. The protective cover serves as a heat sink and removes heat from electrical components mounted to a disc drive printed circuit board assembly. The heat sink includes a thermally conductive cover fastened to the base of the disc drive assembly having the disc drive circuit board disposed between the base and the thermally conductive cover. Furthermore, the heat sink further includes at least one thermally conductive member that extends between the cover and the circuit board. The thermally conductive members are in thermal communication with the cover and at least one electrical component on the circuit board. Alternatively, the thermally conductive members are tabs that are integrally formed from the protective cover. The thermally conductive members are sized and configured to correspond to the surface area of the electrical component mounted on the PCBA thereby maximizing the heat transfer from the electrical

17 Claims, 5 Drawing Sheets

PROTECTIVE COVER FOR A DISC DRIVE PRINTED CIRCUIT BOARD WHEREIN THE COVER AND A CIRCUIT BOARD COMPONENT ARE THERMALLY CONNECTED

Related Applications

This application claims priority to provisional application Ser. No. 60/140,864, filed Jun. 24, 1999, entitled "PCBA PROTECTIVE COVER USED AS HEAT SINK FOR CHIPS".

TECHNICAL FIELD

The invention relates generally to disc drives and, more particularly, to a printed circuit board assembly cover that is used as a heat sink.

BACKGROUND

Disc drives are data storage devices that store digital data in magnetic form on a rotating storage medium on a disc. Modem disc drives comprise one or more rigid discs that are coated with a magnetizable medium and mounted on the hub of a spindle motor for rotation at a constant high speed. Information is stored on the discs in a plurality of concentric circular tracks typically by an array of transducers ("heads") mounted to a radial actuator for movement of the heads relative to the discs. Each of the concentric tracks is generally divided into a plurality of separately addressable data sectors. The read/write transducer, e.g. a magnetoresistive read/write head, is used to transfer data between a desired track and an external environment. During a write operation, data is written onto the disc track and during a read operation the head senses the data previously written on the disc track and transfers the information to the external environment. Critical to both of these operations is the accurate locating of the head over the center of the desired track.

The heads are mounted via flexures at the ends of a plurality of actuator arms that project radially outward from the actuator body. The actuator body pivots about a shaft mounted to the disc drive housing at a position closely adjacent the outer extreme of the discs. The pivot shaft is parallel with the axis of rotation of the spindle motor and the discs, so that the heads move in a plane parallel with the surfaces of the discs.

Typically, such radial actuators employ a voice coil motor to position the heads with respect to the disc surfaces. The actuator voice coil motor includes a coil mounted on the side of the actuator body opposite the head arms so as to be immersed in the magnetic field of a magnetic circuit comprising one or more permanent magnets and magnetically permeable pole pieces. When controlled direct current (DC) is passed through the coil, an electromagnetic field is set up which interacts with the magnetic field of the magnetic circuit to cause the coil to move in accordance with the well-known Lorentz relationship. As the coil moves, the actuator body pivots about the pivot shaft and the heads move across the disc surfaces. The actuator thus allows the head to move back and forth in an arcuate fashion between an inner radius and an outer radius of the discs.

A majority of the disc drive's essential electronics are mounted on the printed circuit board assembly ("PCBA"). The PCBA is fastened to the bottom exterior surface of the drive and includes electrical components that manage the operations of the disc drive. For example, the PCBA includes electrical components that control the speed of the spindle and position of the actuator arms over the discs. Similarly, the PCBA also includes electrical components that interface with the computer's processor.

Seagate Technology, the assignee of the present invention, currently has installed a metal cover over the PCBA to protect the board, and hence the disc drive's essential electronic circuitry, from electrostatic discharge. The cover also makes disc drive installation less time consuming and less likely to result in damage to the PCBA.

However, in using this metal cover to protect the PCBA, the electrical components mounted on the PCBA are essentially enclosed between the disc drive base deck and the protective cover. As such, the PCBA is not in direct airflow and the ability of the electrical components to effectively dissipate heat generated during operation of the disc drive may be reduced. As efforts continue toward chip consolidation, the risk of overheating increases. Electrical component overheating may cause the PCBA to malfunction due to excessive heating. Accordingly, there is a need for a means for improving heat dissipation in disc drives which include a PCBA protective cover.

The present invention provides solutions to the above and other problems and offers advantages over the prior solutions to the above and other problems. These and various other features as well as advantages which characterize the present invention will be apparent upon reading of the following detailed description and review of the associated drawings.

SUMMARY OF THE INVENTION

The disc drive apparatus in accordance with the present invention incorporates a PCBA protective cover that acts as a heat sink by providing a pathway from the electrical components mounted on the PCBA to the protective cover for dissipating heat.

The heat sink comprises a thermally conductive cover fastened to the base of the disc drive assembly having the disc drive circuit board disposed between the base and the thermally conductive cover. Furthermore, the heat sink comprises at least one thermally conductive member extending between the cover and the circuit board. The thermally conductive members are in thermal communication with the cover and at least one electrical component on the circuit board.

In another embodiment of the invention, the thermally conductive members are tabs integrally formed in and extending from the protective cover. The tabs have a upright portion extending substantially perpendicular to and towards the PCBA. The tabs also have a horizontal portion that extends substantially perpendicular to the distal end of the upright portion. Moreover, the horizontal portion is in contact with at least one electrical component on the PCBA. The horizontal portion is sized and configured to correspond to the surface area of the electrical component mounted on the PCBA.

In yet another embodiment of the invention, the thermally conductive members are spring members in thermal communication with the thermally conductive cover and the circuit board.

These and other features as well as advantages that characterize the present invention will be apparent from a reading of the following detailed description and a review of the associated drawings.

DETAILED DESCRIPTION OF THE PREFERRED EMBODIMENT

Figure 1:
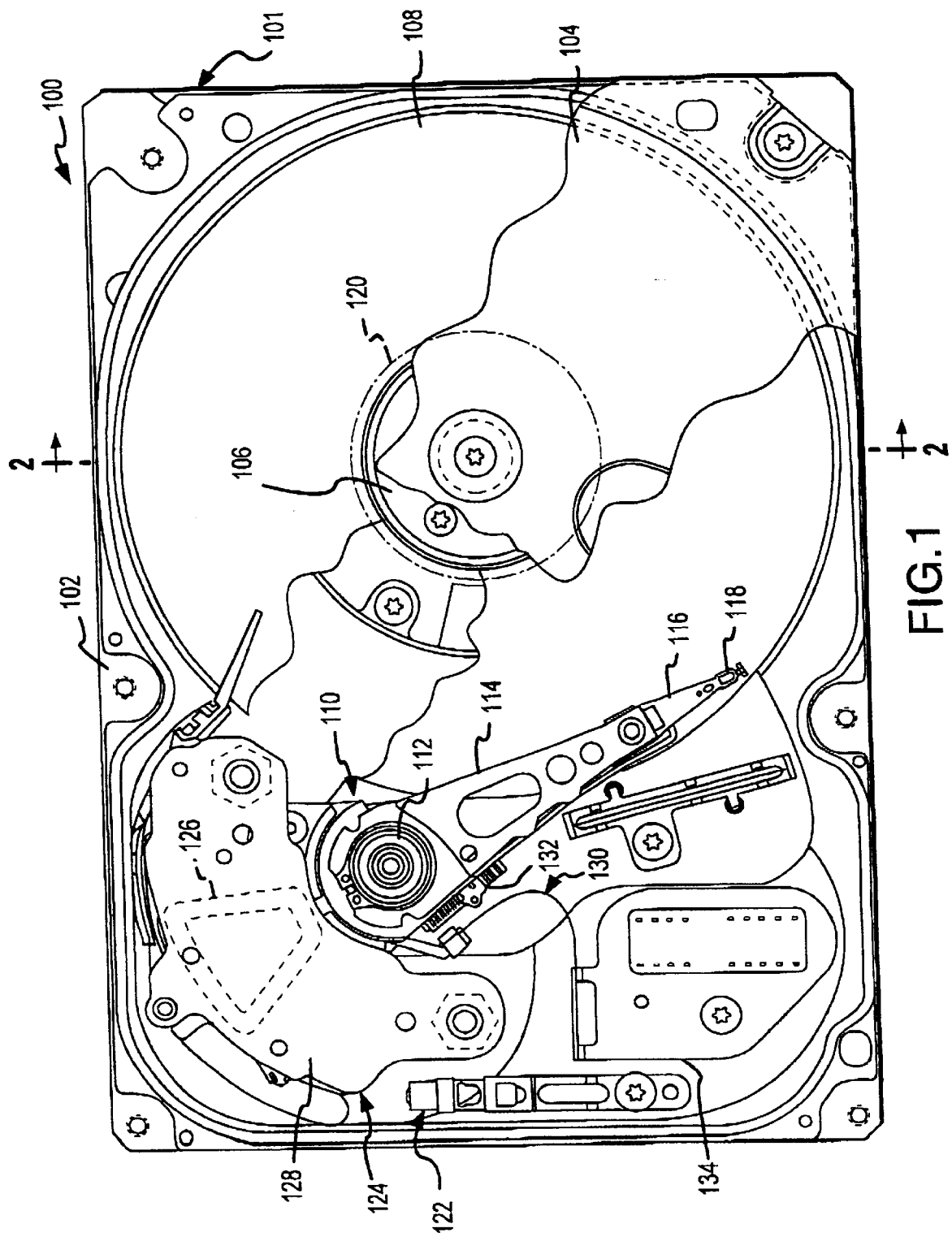
FIG. 1 is a plan view of a disc drive assembly in accordance with the present invention with the head disc assembly cover partially broken away and with portions of the discs broken away.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. This assembly is called a head disc assembly (HDA). The components include a spindle motor 106 which rotates one or more discs 108 at a constant high speed. Information is written to and read from tracks on the discs 108 through the use of an actuator assembly 110, which rotates about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider (not shown) enabling the head 118 to fly in close proximity above the corresponding surface of the associated disc 108.

Figure 3:
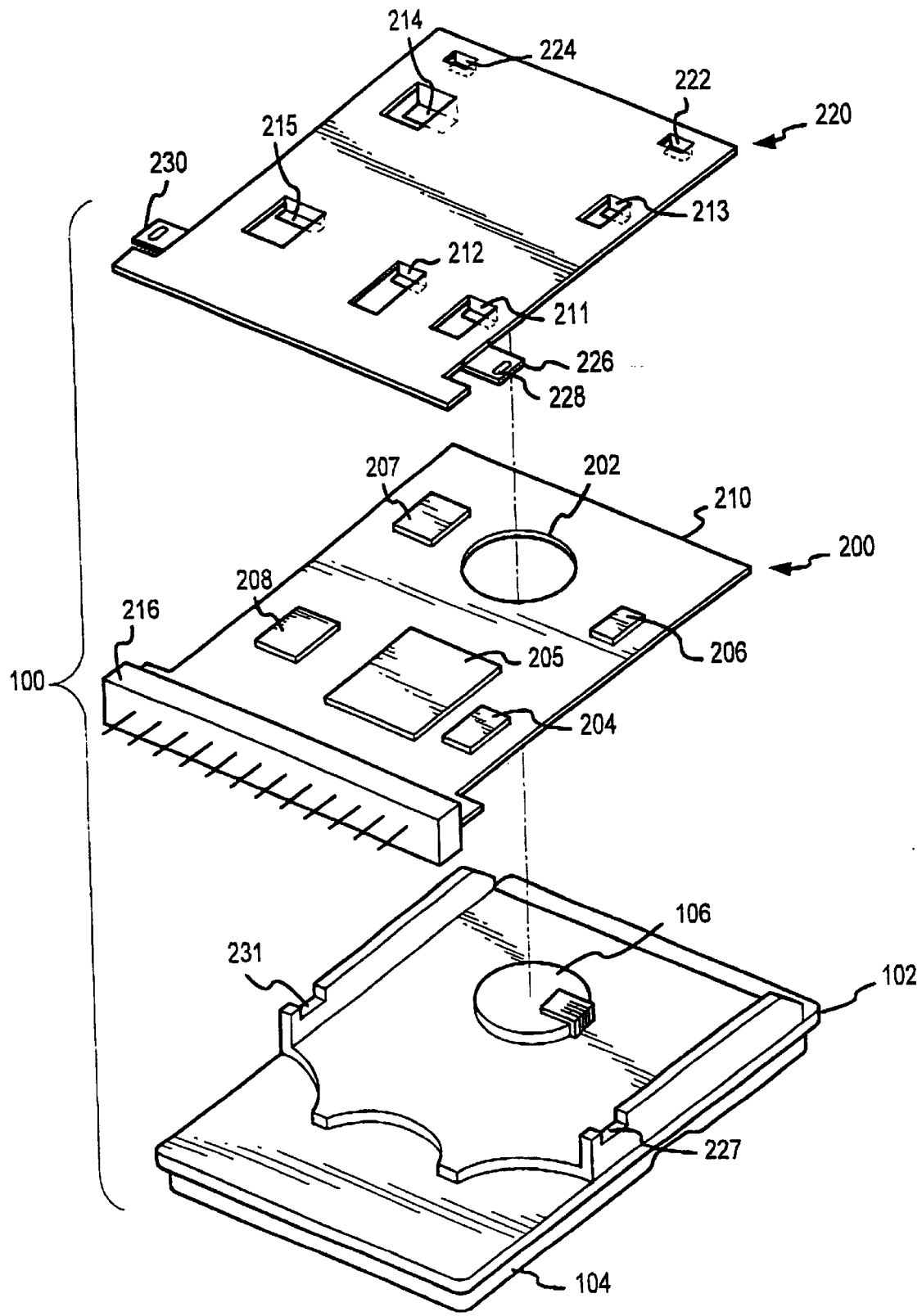
FIG. 3 is an exploded perspective view of a typical hard disc drive assembly incorporating one embodiment of a protective cover used as heat sink in accordance with the present invention.

The spindle motor 106 is typically de-energized when the disc drive 100 is not in use for extended periods of time. The heads 118 are moved over park zones 120 near the inner diameter of the discs 108 when the drive motor is de-energized as shown in FIG. 3. The heads 118 are secured over the park zones 120 through the use of an actuator latch arrangement 122, which prevents inadvertent rotation of the actuator arms 114 when the heads are parked.

The radial position of the heads 118 is controlled through the use of a voice coil motor (VCM) 124, which typically includes a coil 126 attached to the actuator assembly 110, as well as one or more permanent magnets and return plates 128 which are spaced apart and establish a vertical magnetic field between them in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112 and the heads 118 are caused to move across the surfaces of the discs 108.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and for amplifying read signals generated by the heads 118 during a read operation. The flex assembly terminates at a flex bracket 134 for communication through the base deck 102 to a disc drive PCBA 200 (see discussion and FIGS. 2 and 3 below) mounted to the bottom side of the disc drive 100.

Figure 2:
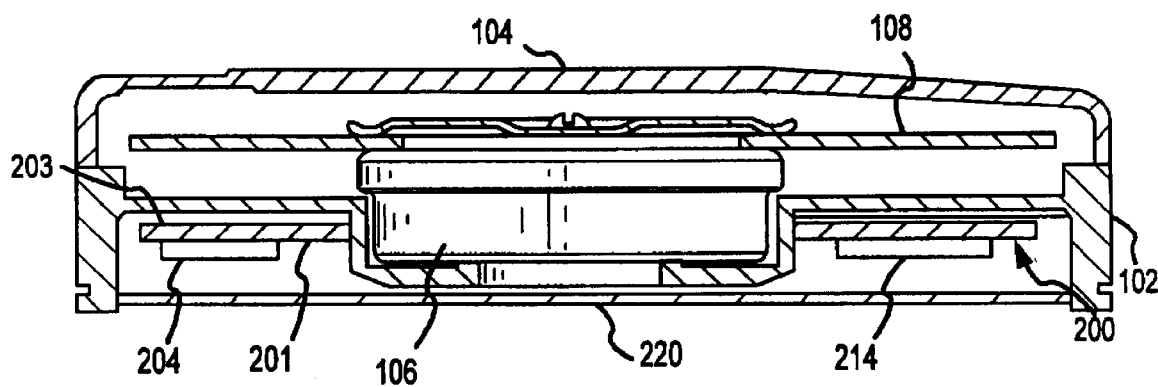
FIG. 2 is a cross-sectional view through the drive motor of the hard disc drive assembly taken along line 2—2 in FIG. 1.

Referring now to FIG. 2, a cross-sectional view of the hard disc drive assembly of FIG. 1 is shown. The PCBA 200 is positioned adjacent the base deck 102 of the disc drive 100. The PCBA 200 has a first side 203 facing towards the disc drive base deck 102. Similarly, the PCBA 200 has a second side 201 facing away from the disc drive base deck 102.

FIG. 3 is a perspective exploded view of the bottom portions of the disc drive 100. The head disc assembly top cover 104 is shown attached to the disc drive base 102. The bottom surface of the spindle motor 106 can extend through the disc drive base 102.

Typically, the disc drive PCBA 200 can be mounted to the bottom surface of disc drive base 102 using screws or other known threaded structures (not shown). The PCBA 200 is generally rectangular in shape conforming to the shape and size of the base deck 102 of the disc drive. The PCBA 200 includes an aperture 202 receiving the bottom surface of spindle motor 106 which typically extends through the disc drive base deck 102. Mounted on the second side 201 of PCBA 200 are electrical components 204–208. In the embodiment of the invention shown in FIGS. 1–4, the electrical components 204–208 are integrated circuit chips controlling the operation of the various components of the disc drive 100 such as the actuator assembly 110, the drive motor 106 and the main processor chip for the disc drive interface control.

The protective cover 220 is attached to the disc drive base 102 using attachment members 226 and 230, respectively. The attachment members 226 and 230 rest within the attachment guides 227 and 231 located on the disc drive base 102. The protective cover 220 can also be attached to the PCBA 200 using attaching members 222 and 224. As stated earlier, the protective cover 220 protects PCBA 200 from electrostatic damage and makes installation of the disc drive 100 into a computer easier.

The protective cover 220 is preferably made from a material that is thermally conductive. For example, the protective cover 220 can be made from copper or a copper alloy such as copper beryllium. Alternatively, the protective cover 220 can be made from steel or some other suitable material that has good thermal conductivity. The PCBA 200 is disposed between the protective cover 220 and the disc drive base 102.

The protective cover 220 comprises thermally conductive members 211–215. The thermally conductive members 211–215 extend between the protective cover 220 and the PCBA 200. Furthermore, the thermally conductive members 211–215 are configured and arranged on the protective cover 220 to correspond to the location of the electrical components 204–208 mounted on the PCBA 200. In so doing, when the protective cover 220 and the PCBA 200 is fastened to the disc drive base 102, the thermally conductive members 211–215 are in thermal communication with at least one of the electrical components 204–208 mounted on the PCBA 200. For example, thermal conductive member 211 is in thermal contact with electrical component 204.

The thermally conductive members 211–215 are preferably made from a material that has good thermal conductivity. For example, the thermally conductive members 211–215 can be made from the same or similar material as the protective cover 220, such as copper or a copper alloy such as copper beryllium. Alternatively, the thermally conductive members 211–215 can be made from steel or some other suitable material having good thermal conductivity.

Figures 4, 5:
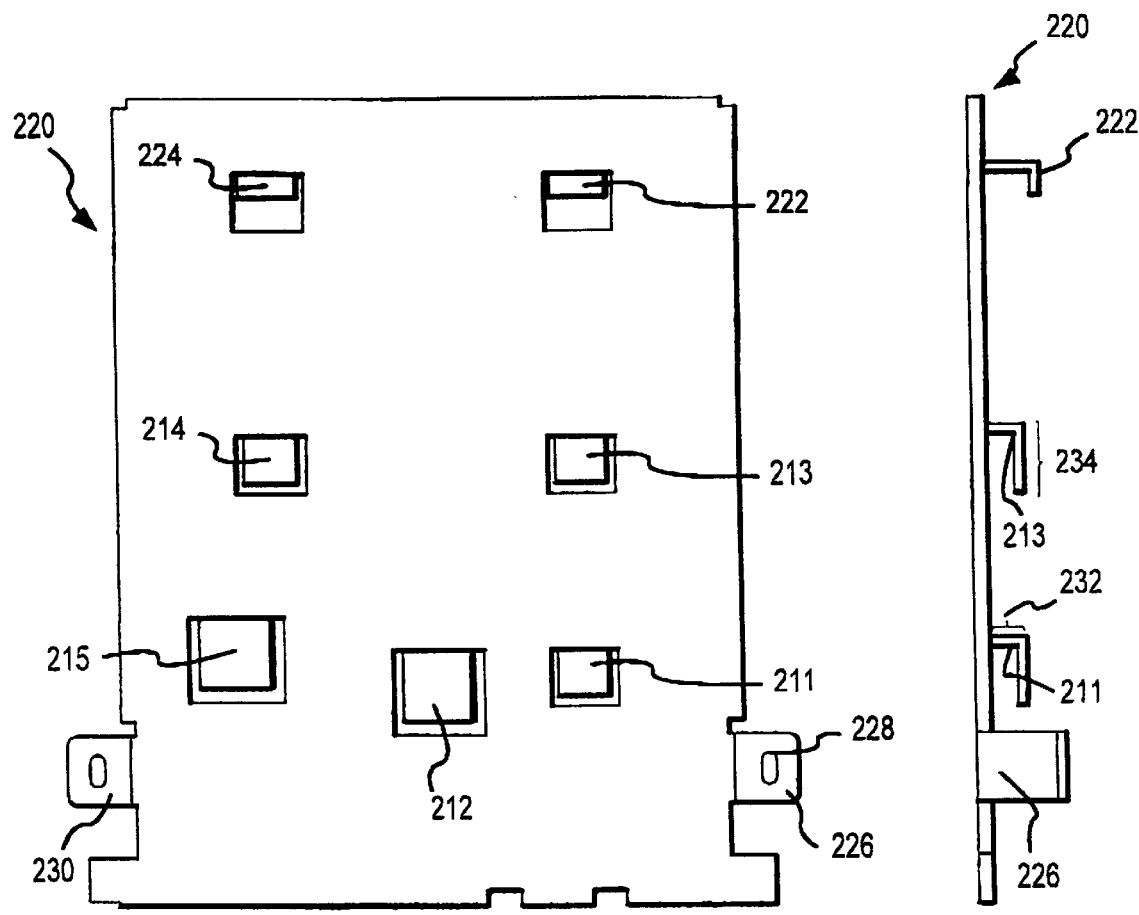
FIG. 4 is plan view of a protective cover used as a heat sink in accordance with the present invention.
FIGS. 5, 6 and 7 are side views showing alternative embodiments of the protective cover used as a heat sink in FIG. 4.

In one embodiment of the invention, the thermally conductive members 211–215 are tabs integrally formed in and extending from the protective cover 220. Alternatively, the thermally conductive members 211–215 can be tack welded to the protective cover 220 or affixed to the protective cover 220 using a similar process. As shown in FIG. 5, the thermally conductive members 211–215 have an upright portion 234 extending towards the PCBA 200 and substantially perpendicular to the protective cover 220. The length of the upright portion 234 is sized and configured to correspond to the distance between the protective cover 220 and the top of the electrical components mounted on the PCBA 200. The thermally conductive members 211–215 also have a substantially horizontal portion 232 extending from the distal end of the upright portion 234. Accordingly, horizontal portion 232 extends substantially perpendicular to the upright portion 234 and contacts at least one electrical component on the PCBA 200. The horizontal portion 232 further defines a surface area substantially parallel to the PCBA 200. It is also envisioned that the substantially horizontal portion 232 of the thermal conductive member could be at a slightly downward angle toward the electrical components of the PCBA. In such case, the portion 232 could be made from a flexible, thermally conductive material that would deform in shape upon interaction with the surface of the electrical component.

While the disc drive 100 is operating, the electrical components 204–208 can generate substantial amounts of heat. Typically, the heat generated by the electrical components 204–208 is dissipated across the exposed surface area of the electrical components 204–208 that faces away from the PCBA 200. Accordingly, in the embodiment of the invention shown in FIG. 3, the thermally conductive members 211–215 are sized and configured to correspond to the exposed surface area of the electrical components 204–208. For example, the horizontal portion 232 can be sized and configured such that its surface area is substantially equal to the exposed surface area of the electrical components 204–208. In so doing, the amount of heat removed by the thermally conductive members 211–215 from electrical components 204–208 can be maximized.

Figure 6:
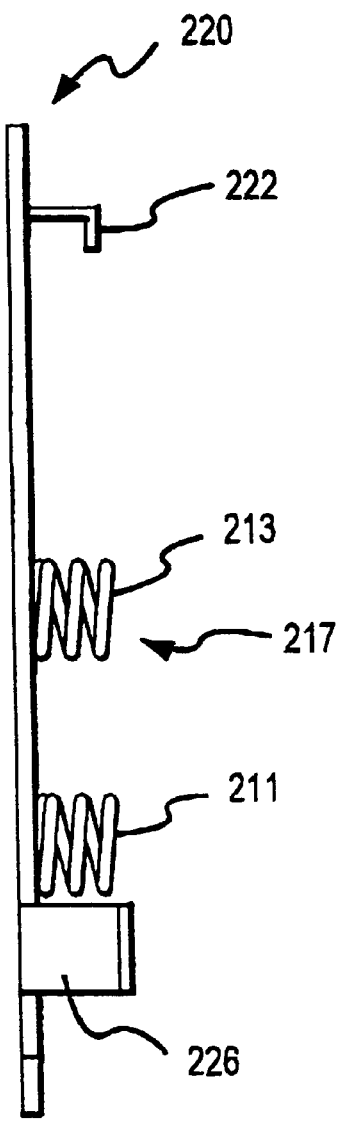
Figure 7:
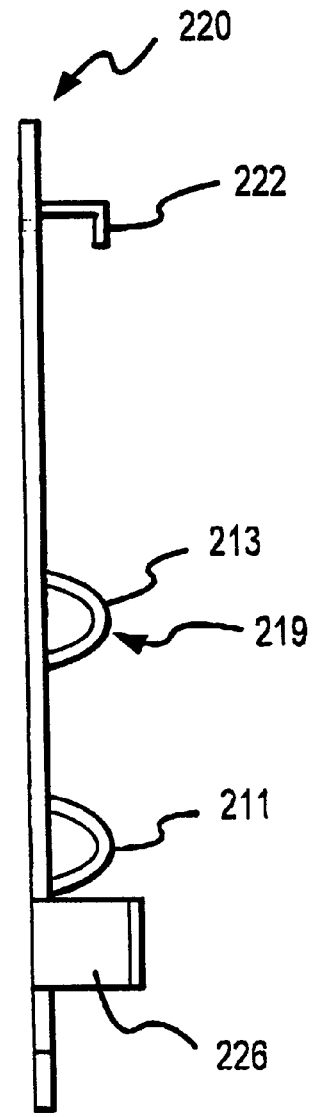

It should be understood that the thermally conductive members 211–215 can be any structure or substance that provides a pathway for removing heat from the electrical components mounted on the PCBA 200. For example, the thermally conductive members 211–215 can be spring members 217 that contact both the protective cover 220 and PCBA 200 (as shown in FIG. 6). Alternatively, the thermally conductive members can be depressions 219 stamped or otherwise formed in the protective cover 220 (as shown in FIG. 7). Similarly, heat conductive grease (not shown) or heat conductive polymers can be disposed between the protective cover 220 and the PCBA 200. In any event, the thermally conductive members 211–215 would be in thermal communication with the electrical components 204–208 mounted on the PCBA 200. Accordingly, the thermally conductive members 211–215 would dissipate heat from the electrical components 204–208 to the PCBA 200 acting as a heat sink. It should also be understood that the number of thermal conductive members may vary and do not have to match the number of electrical components. Thus, members 211–215 are for illustrative purposes only and should not be construed as limiting the scope of the present invention.

In summary, a heat sink for removing heat from a disc drive (such as 100) in accordance with the present invention wherein the disc drive has a base (such as 102) and a circuit board (such as 200) mounted to the base. The circuit board (such as 200) has a first side (such as 203) facing the base and a second side (such as 201) facing away from the base. The circuit board (such as 200) also has electronic components (such as 204–208) mounted to the second side of the circuit board. The heat sink comprises a thermally conductive cover (such as 220) fastened to the base (such as 102), wherein the circuit board (such as 200) is disposed between the base (such as 102) and the thermally conductive cover (such as 220). Moreover, the circuit board (such as 200) is substantially parallel to the base (such as 102) and the thermally conductive cover (such as 220).

Furthermore, the heat sink further preferably comprises one or more thermally conductive members (such as 211–215) that extends between the cover (such as 220) and the circuit board (such as 200). Each of the thermally conductive members are in thermal communication with the cover (such as 220) and at least one electrical component (such as either 204, 205, 206, 207 or 208) on the circuit board.

Alternatively, each of the thermally conductive members (such as 211–215) can be a tab integrally formed from the cover (such as 220). The tab defines an upright portion (such as 234) that extends towards the circuit board (such as 200) and is in contact with at least one electrical component (such as either 204, 205, 206, 207 or 208) on the circuit board. The length of the upright portion (such as 234) extending towards the circuit board (such as 200) is sized and configured to correspond to the distance between the cover and the top of the electrical components on the circuit board.

The tab further defines a substantially horizontal portion (such as 232) extending from the distal end of the upright portion (such as 234). The substantially horizontal portion (such as 232) is in contact with at least one electrical component (such as either 204, 205, 206, 207 or 208) on the circuit board. Furthermore, the horizontal portion (such as 232) is sized and configured to correspond to the surface area of the electrical component on the circuit board.

In another embodiment, each of the thermally conductive members (such as 211–215) can be a spring member in thermal communication with the thermally conductive cover (such as 220) and the circuit board (such as 200). Still yet, the thermally conductive member (such as 211–215) can be a depression formed in the thermally conductive cover (such as 220) sized to touch the underlying electrical component. Moreover, the thermally conductive members (such as 211–215) can be thermally conductive plastic polymer disposed between the thermally conductive cover (such as 220) and the electrical component (such as either 204, 205, 206, 207 or 208) on the circuit board.

Stated another way, the invention may be viewed as a heat sink for removing heat from a disc drive (such as 100). The disc drive has a base (such as 102) and a circuit board (such as 200) mounted to the base. The circuit board (such as 200) has a first side (such as 203) facing the base (such as 102) and a second side (such as 201) facing away from the base (such as 102). The circuit board (such as 200) also has electronic components (such as 205–208) mounted to the second side (such as 201). The heat sink comprises a thermally conductive cover (such as 220) adapted to be fastened to the base (such as 102), wherein the circuit board (such as 200) is disposed between the base (such as 102) and the thermally conductive cover (such as 220). Furthermore, the thermally conductive members (such as 211–215) can be integrally formed from the thermally conductive cover (such as 220). The thermally conductive members (such as 211–215) extend between the cover (such as 220) and the circuit board (such as 200). Therefore, each of the thermally conductive members (such as 211–215) are adapted to be in thermal communication with the cover (such as 220) and at least one electrical component (such as either 204, 205, 206, 207 or 208) on the circuit board (such as 200) and are further sized and configured to correspond to the surface area of the components on the circuit board Each of the thermally conductive members (such as 211–215) can be a tab defining an upright portion (such as 234) that extends substantially perpendicular to the circuit board (such as 200). Furthermore, the upright portion (such as 234) is adapted to be in contact with at least one electrical component on the circuit board (such as either 204, 205, 206, 207 or 208). Furthermore, the tab further defines a horizontal portion (such as 232) that extends substantially perpendicular to the distal end of the upright portion (such as 234). The horizontal portion (such as 232) is in contact with at least one electrical component on the circuit board (such as either 204, 205, 206, 207 or 208). Moreover, the length of the upright portion (such as 234) that extends substantially perpendicular to the circuit board (such as 200) is sized and configured to correspond to the distance between the cover and the top of the electrical components on the circuit board.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A heat sink for removing heat from a disc drive having a base and a circuit board mounted to the base, wherein the circuit board has a first side facing the base and a second side facing away from the base, the circuit board further having electronic components mounted to the second side, the heat sink comprising:
   a thermally conductive cover fastened to the base, wherein the circuit board is disposed between the base and the thermally conductive cover; and
   a thermally conductive member extending between the cover and the circuit board in thermal communication with the cover and an electrical component on the circuit board.

2. The heat sink of claim 1, wherein the thermally conductive member is a tab integrally formed from the cover, the tab defining an upright portion extending toward the circuit board.

3. The heat sink of claim 2, wherein the tab further defines a horizontal portion extending from the distal end of the upright portion so as to contact an electrical component on the circuit board.

4. The heat sink of claim 3, wherein the horizontal portion is sized and configured to correspond to a surface area of the electrical component on the circuit board.

5. The heat sink of claim 2, wherein the length of the upright portion extending toward the circuit board is sized and configured to correspond to the distance between the cover and the top of the electrical components on the circuit board.

6. The heat sink of claim 1, wherein the thermally conductive member is a spring member adapted to be in thermal communication with the thermally conductive cover and the circuit board when the cover is installed on the base.

7. The heat sink of claim 1, wherein the thermally conductive member is a depression formed in the thermally conductive cover.

8. The heat sink of claim 1 further comprising a thermally conductive plastic polymer disposed between the thermally conductive cover and the electrical component on the circuit board to thermally connect the electrical component to the cover.

9. The heat sink of claim 1, wherein the circuit board is mounted substantially parallel to the base and the thermally conductive cover.

10. A heat sink for removing heat from a disc drive having a base and a circuit board mounted to the base, wherein the circuit board has a first side facing the base and a second side facing away from the base, the circuit board further having electronic components mounted to the second side, the heat sink comprising:
    a thermally conductive cover adapted to be fastened to the base, wherein the circuit board is disposed between the base and the thermally conductive cover; and
    a thermally conductive member integrally formed from the thermally conductive cover extending between the cover and the circuit board, wherein the thermally conductive member is adapted to be in thermal communication with the cover and an electrical component on the circuit board and sized and configured to correspond to a surface area of the component on the circuit board.

11. The heat sink of claim 10, wherein the thermally conductive member is a tab defining an upright portion extending substantially perpendicular toward the circuit board so as to contact the electrical component on the circuit board.

12. The heat sink of claim 11, wherein the tab further defines a horizontal portion extending substantially perpendicular to the distal end of the upright portion adapted to contact the electrical component on the circuit board.

13. The heat sink of claim 11, wherein the length of the upright portion is sized and configured to correspond to the distance between the cover and the top of the electrical component on the circuit board.

14. A disc drive having a base supporting a drive motor carrying a data disc, an actuator assembly adjacent the data disc for reading and writing data to and from the data disc, and a cover over the disc and the actuator assembly fastened to one side of the base, and a printed circuit board carrying a heat producing electronic component thereon fastened to the other side of the base for interfacing and controlling the actuator assembly and the drive motor attached to the base, the disc drive comprising:
    a thermally conductive cover fastened to the base and extending over the printed circuit board, wherein the cover has a thermally conductive member in thermal contact with the heat producing electronic component on the printed circuit board.

15. The disc drive according to claim 14 wherein the thermally conductive member is a tab on the cover bent toward the printed circuit board.

16. The disc drive according to claim 14 wherein the thermally conductive member is a thermally conductive spring member extending between the cover and the electronic component on the printed circuit board.

17. A heat sink for removing heat from a disc drive having a base and a circuit board mounted to the base, wherein the circuit board has a first side facing the base and a second side facing away from the base, the circuit board furtherer having electronic components mounted to the second side, the heat sink comprising:

a thermally conductive cover adapted to be fastened to the base, wherein the circuit board is disposed between the base and the thermally conductive cover; and means for conducting heat produced by the electronic components to the cover disposed between the components and the cover.

* * * * *